UNITED STATES PATENT OFFICE.

JOHN T. H. DEMPSTER, OF SCHENECTADY, NEW YORK, ASSIGNOR TO GENERAL ELECTRIC COMPANY, A CORPORATION OF NEW YORK.

DECARBURIZED SILICON AND METHOD FOR MAKING THE SAME.

1,019,431.  Specification of Letters Patent.  Patented Mar. 5, 1912.

No Drawing.  Application filed January 20, 1909.  Serial No. 473,371.

*To all whom it may concern:*

Be it known that I, JOHN T. H. DEMPSTER, a citizen of the United States, residing at Schenectady, in the county of Schenectady, State of New York, have invented certain new and useful Improvements in Decarburized Silicon and the Method for Making the Same, of which the following is a specification.

My present invention comprises decarburized silicon, having a specific resistance much higher than that of the silicon heretofore used in the electrical art.

My invention also includes the method of treating commercial silicon to produce the material of high resistance above referred to.

Commercial cast silicon, such as is obtainable in the open market, is made by reduction of silica with carbon in an electric furnace. It runs relatively high in carbon, the exact proportion varying somewhat for different furnace runs, but being sometimes as high as 3%. Cast resistance sticks made from this commercial silicon show a resistance of about three ohms for a stick eight inches long and one-quarter of an inch in diameter.

According to my present invention, commercial silicon is subjected to a decarburizing process to yield a product consisting essentially of silicon free from carbon. I have found that when this material is cast into rods or other suitable forms it has a specific resistance much higher than the cast silicon sticks now in common use,—even two or three times higher. The decarburizing, which in itself involves novelty, is carried out by melting the silicon in the presence of carbon dioxid, produced as by the decomposition of an alkaline earth carbonate, for instance, calcium carbonate. The operation may be carried out in a clay lined graphite crucible heated in an oil furnace. In charging the crucible, I prefer to put in first a layer of a decomposable carbonate, as calcium carbonate, which may be in the form of lumps, to the extent of about 10% by weight of the silicon to be decarburized, and then the silicon on top of the carbonate. The crucible is then introduced into a furnace capable of raising the charge to the melting point of silicon, which is in the neighborhood of 1400 to 1500° centigrade. The silicon oxidizes at the surface with the formation of a layer of silica. As the heat in the oil furnace is greatest in the upper zone, the silicon melts before the carbonate at the bottom of the crucible breaks up with the formation of calcium oxid and carbon dioxid. The carbon dioxid bubbles up through the molten silicon and reacts with the carbon content to form carbon monoxid, which escapes at the surface and burns to carbon dioxid. The calcium oxid also rises to the surface, where it combines in part at least with the layer of silica, forming a slag of calcium silicate, which protects the silicon from further oxidation. The fused and decarburized silicon produced as above described, can then be cast in the ordinary manner into rods or sticks. I find that a rod 8" long and $\frac{1}{4}$" in diameter has a resistance of about 7 ohms in other words .172 ohms per inch cube, thus showing a specific resistance far above that of the so-called silicon resistance sticks now in use in the electrical arts. While I attribute the increased resistance to the absence of carbon, it seems altogether possible that the treatment with a decomposable carbonate may have some action not easily explained. I do not, therefore, desire to be limited to any theory concerning the principle involved.

What I claim as new and desire to secure by Letters Patent of the United States, is—

1. The process of decarburizing silicon, which consists in heating the carbon-containing silicon in the presence of carbon dioxid.

2. The method of decarburizing silicon, which consists in fusing the silicon over a decomposable carbonate.

3. The process, which consists in heating silicon containing carbon in the presence of an alkaline earth carbonate and then casting the decarburized fusion so produced.

4. The process, which consists in melting silicon containing carbon in the presence of a decomposable carbonate.

5. The process, which consists in heating electric furnace silicon in a crucible containing limestone to produce fluid silicon substantially free from carbon and having a specific resistance when cold materially higher than the electric furnace silicon with which the process was begun.

6. An article of manufacture, consisting essentially of decarburized cast silicon.

7. An article of manufacture, consisting essentially of silicon decarburized to the extent to have a specific resistance of substantially .172 ohms per inch cube at room temperature.

In witness whereof, I have hereunto set my hand this 18th day of January, 1909.

JOHN T. H. DEMPSTER.

Witnesses:
 BENJAMIN B. HULL,
 MARGARET E. WOOLLEY.

Copies of this patent may be obtained for five cents each, by addressing the "Commissioner of Patents, Washington, D. C."